United States Patent [19]

Rabedeau

[11] 4,123,135
[45] Oct. 31, 1978

[54] OPTICAL SYSTEM FOR ROTATING MIRROR LINE SCANNING APPARATUS

[75] Inventor: Melbourne E. Rabedeau, Saratoga, Calif.

[73] Assignee: International Business Machines Corporation, Armonk, N.Y.

[21] Appl. No.: 812,028

[22] Filed: Jun. 30, 1977

[51] Int. Cl.² .............................................. G02B 27/17
[52] U.S. Cl. ....................................... 350/6.8; 358/199
[58] Field of Search ................ 350/6, 7, 225, 214, 350/174 SL, 6.1–6.9; 356/138; 358/128, 199

[56] References Cited

U.S. PATENT DOCUMENTS

| | | | |
|---|---|---|---|
| 1,962,892 | 6/1934 | Chretien | 350/225 |
| 2,944,464 | 7/1960 | Rosin | 350/225 |
| 3,750,189 | 7/1973 | Fleischer | 350/7 |
| 3,930,729 | 1/1976 | Gunn | 350/175 SL |
| 3,995,110 | 11/1976 | Starkweather | 350/7 |

*Primary Examiner*—John K. Corbin
*Assistant Examiner*—B. W. del los Reyes
*Attorney, Agent, or Firm*—George E. Roush

[57] ABSTRACT

This optical system permits larger tolerances in mirror facet pitch angles for rotating mirror line scanning apparatus without the use of expensive lenses having toroidal and like complex surfaces or lenses employing elements that have one cylindrical surface whose center of curvature lies on or very near the axis of the scanned surface. A lens system having a negative cylindrical element with its axis perpendicular to the plane of deflection is employed in a rotating mirror scanning arrangement. The lens system images the rotating mirror surface on the scan line in an azimuth perpendicular to the plane of deflection of the beam while ringing the collimated rays of the light source in the plane of deflection of the beam to focus in the one scan line.

12 Claims, 5 Drawing Figures

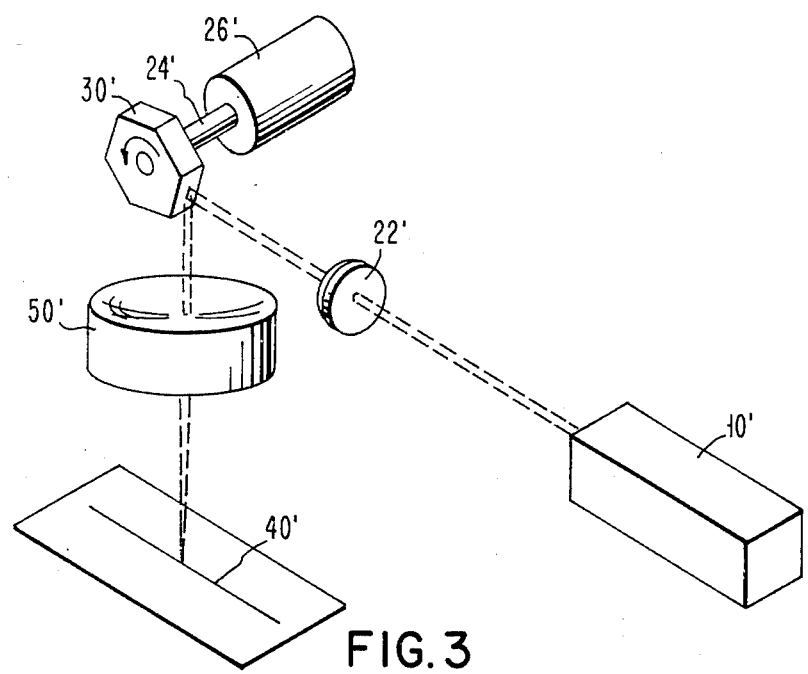
FIG. 3
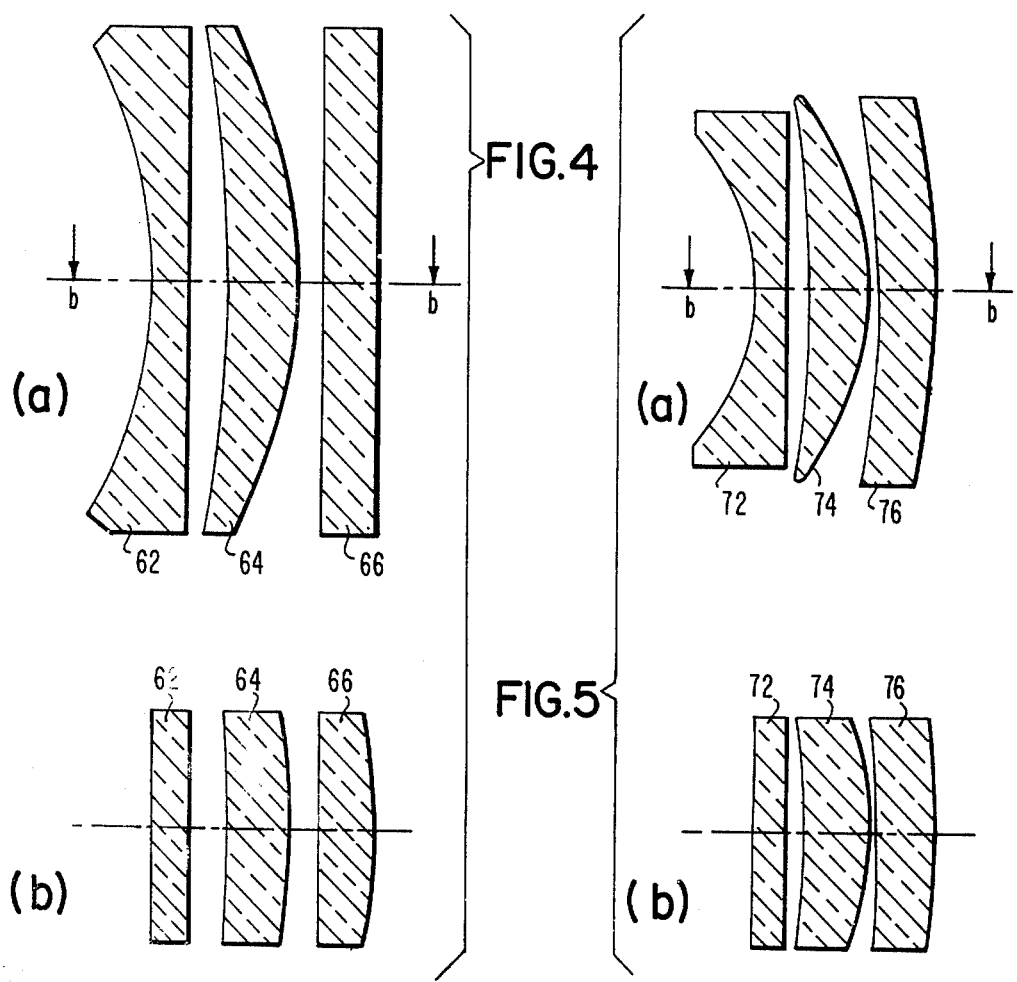
FIG. 4
FIG. 5

OPTICAL SYSTEM FOR ROTATING MIRROR LINE SCANNING APPARATUS

The invention is directed to an optical system that is an improvement over that described and claimed in U.S. Pat. No. 3,750,189 issued on the 31st day of July 1973 to John Martin Fleischer for "Light Scanning and Printing System."

That patent to Fleischer discloses an optical system that permits the use of relatively large mirror facet pitch angle tolerances in rotating mirror scanners. This patent teaches the use of a cylindrical lens to image a light beam in one azimuth to a line on a facet of a multi-sided rotating mirror and the use of a second cylindrical lens and/or a toroidal lens to receive and recollimate the light reflected from the rotating mirror and a spherical lens to focus the beam in both azimuth angles to a small spot on the line to be scanned. It has been taught that in prior art systems with any appreciable deflection angle, a toroidal lens should be used to recollimate the beam reflected from the mirror in order to maintain beam collimation over the entire deflection angle. Toroidal lenses are very difficult and expensive to make; hence, for very high resolution systems, a toroidal lens of satisfactory quality in many cases is not economically practical.

The closest prior art other than the above-mentioned Fleischer patent is found in U.S. Pat. No. 3,946,150 issued in the 23rd day of Mar. 1976 to David Graften for "Optical Scanning". This latter patent utilizes a divergent beam which illuminates an area considerably larger than the mirror facet and a cylindrical lens located very near the imaging surface for imaging the beam on that imaging surface; the latter lens of necessity must be almost as long as the line of scan.

According to the invention a lens system images the rotating mirror surface on the scan plane in an azimuth perpendicular to the plane of deflection of the beam while bringing the collimated rays of the light source in the plane of deflection of the beam to focus in one and the same scan line. In order to achieve the necessary difference in lens power in the two normally located azimuths, and to flatten the field of the focussed scanning beam, a negative cylindrical optical element with its axis perpendicular to the plane of deflection is used in conjunction with positive spherical or positive spherical and cylindrical elements. The objective of the use of this lens system is the relaxation of required tolerance on the axis-of-rotation to mirror facet angle in rotating mirrors for optical scanners.

In order that full advantage obtain in the practice of the invention, preferred embodiments thereof, given by way of examples only, are described in detail hereinafter with reference to the accompanying drawing, forming a part of the specification, and in which:

FIG. 3 is a three dimensional diagram of a line scanning optical arrangement illustrating the changes in the light beam in a system according to the invention; and FIGS. 4 and 5 — views (a) and (b) being taken together in each instance — are plan and elevation views of lens systems according to the invention.

Figure 1:
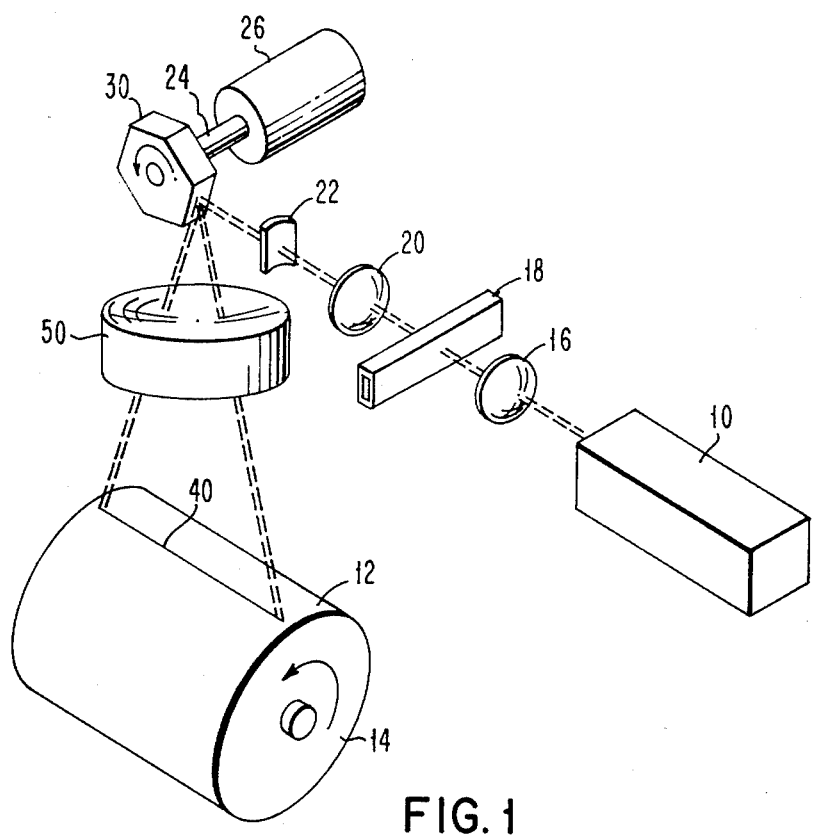
FIG. 1 is a functional diagram of the general arrangement of an optical system of the type having a problem that is economically solved by the optical system according to the invention.

An optical line scanning arrangement having a rotating optical mirror of the type for which a lens system according to the invention is ideal is diagrammed in FIG. 1. In an electrophotographic system, a helium-neon or like laser 10 provides a beam of rays of radiant photo energy for exposing a photoconductor 12 which is laid down on a rotatable drum 14. An optical beam compressor 16 reduces the laser beam diameter in order to minimize the rise time in an acousto-optical modulator 18. The light is modulated in conventional manner in accordance with intelligence to be recorded in the photoconductor 12. A beam expander 20 follows the modulator for enlarging the beam diameter to that required to produce a desired near diffraction-limited focussed spot size at the photoconductor 12. A cylindrical lens 22 focusses the beam to a narrow line of light on the facet of, and perpendicular to the axis of the rotating mirror 30. The rotating mirror 30 provides the necessary one dimensional deflection for scanning a line 40 across the drum 12. A lens system 50 is arranged for focusing the reflected beam on the photoconductor 12 and is arranged for eliminating beam position errors at the photoconductor 12 due to tilted mirror facets and/or irregular runout of the mirror as will be described in more detail hereinafter.

Figure 2:
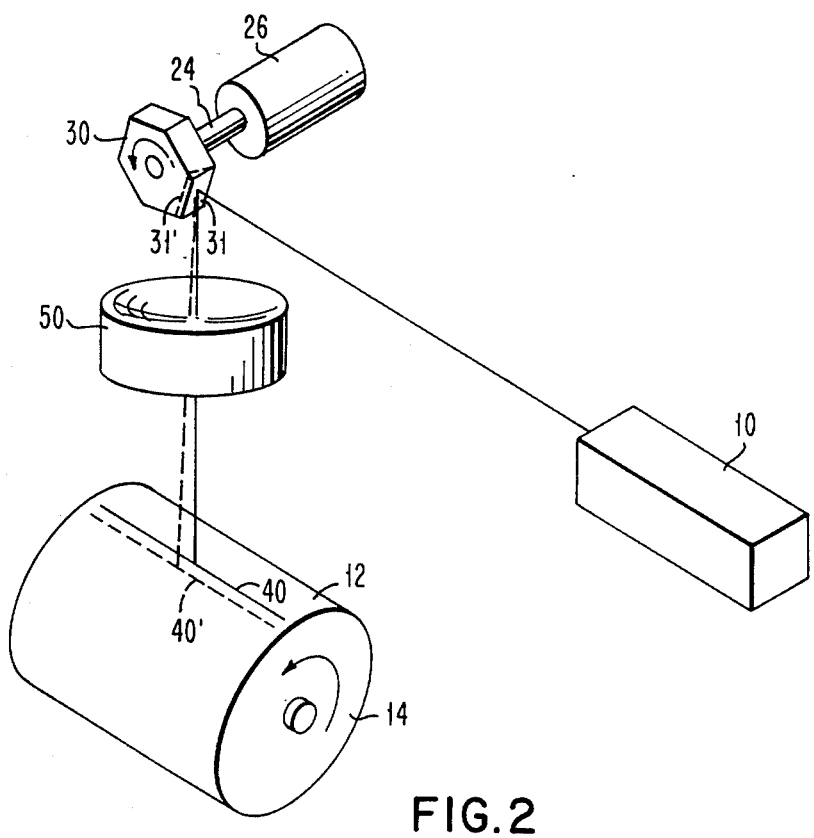
FIG. 2 is a graphical representation of the basic optical problem useful in an understanding of the optical system according to the invention.

FIG. 2 illustrates the problem economically solved with a lens system according to the invention. If any facet 31 of the rotating mirror 30 is not situated at the same angle relative to the axis of rotation of the mirror as are the other facets, successive scans produced by that tilted facet 31' of the mirror 30 will not be superimposed as the successive scan of the facets 31 will be. In some rotating mirror scanners, a varation in the facet pitch angle of as little as six seconds of arc would result in excessive scan line position variability, if neither the system described in the above mentioned U.S. Pat. No. 3,750,189 nor the system described herein is used.

The optical scanning system as described hereinafter serves to image the beam in the azimuth normal to the plane of deflection of the beam on, or substantially near, the mirror facet with a cylindrical lens and to employ an optical lens system that images the rays diverging from the mirror facet to a small spot on the scan plane, while imaging the collimated rays in the plane of deflection to a small spot on the same scan line. This is shown in FIG. 3, and in the case of the above mentioned U.S. Pat. No. 3,750,189, toroidal and spherical lenses are employed for this purpose. However, the optical lens system 50 shown in FIGS. 4 and 5 accomplish the same function with less difficulty and at less cost. It is now seen that it is not necessary to first recollimate the beam reflected from the mirror as described in U.S. Pat. No. 3,750,189. By removing the restriction of recollimating the beam, it is possible according to the invention to design lenses using negative cylindrical lenses in combination with spherical lenses to flatten the field of the lens system and to give the necessary difference in total power in the two azimuths. The axis of the negative cylindrical lens is perpendicular to the plane of deflection of the beam, while that of the positive cylindrical lens in the above mentioned U.S. Pat. No. 3,750,189 is parallel to the plane of deflection of the beam.

FIG. 3 is a schematic "three dimensional" diagram illustrating a basic optical arrangement according to the invention. A source 10' of radiant flux, which may be an optical laser and the like, projects a beam comprising a bundle of rays of radiant energy toward apparatus 30' for ultimately deflecting the beam through a lens system 50' in a plane defined as the plane of deflection which is normal to the rotational axis of the deflecting apparatus, shown here as a multi-faceted rotating mirror 30'. This deflection plane contains the scan line 40'. A cylindrical lens 22' with the axis thereof lying in the plane of deflection accepts the beam of substantially circular cross-section and serves to pass the rays of photo energy substantially without refraction in plane parallel to the plane of deflection but bringing the rays of the beam in planes normal to the plane of deflection substantially to a focus at the facets of the rotating mirror 30'. In other words, the circular cross-section beam effectively is converted to a "chisel tipped" beam. The reverse conversion takes place between the facets and the lens system 50'. As will later be discussed, the optical system according to the invention will accomodate focussing to a line near the plane that the mirror facets define in the deflecting mode (as contrasted to the idling mode) of operation. Thus by relieving the restriction for focussing the beam exactly at the facet plane, the optical system according to the invention aids in lowering costs of manufacture.

The line of flux projected on a facet 31" is deflected by movement of the reflecting surface on the mirror 30', through a lens system 50' according to the invention, to apparatus, for example an electrophotographic drum, arranged for intercepting the rays of radiant energy at a line (at least) lying in the plane of deflection and normal to the axis of the lens system 50'. The latter is arranged for bringing the rays of radiant energy on the deflecting system to a spot on the line of deflection in the intercepting apparatus despite tilt of a mirror facet 31' due to inaccuracies of construction of the mirror and due to variations in the facet positioning because of vibration and/or run-out of the mirror assembly.

One lens system 50 according to the invention is shown in FIG. 4 in conventional cross-section as used in optical work. FIG. 4(a) is the optical cross-section in the plane of beam deflection, while FIG. 4(b) is the optical cross-section in a plane normal to the deflection plane. The optical system is composed of a negative plano-concave cylindrical lens element 62 having the axis thereof in the plane perpendicular to the plane of deflection, a positive spherical lens element 64 and a positive cylindrical lens element 66 having the axis parallel to the plane of deflection. In this design, the relative amount of power in the plane of deflection and normal to the plane of deflection as required for the particular scanning system for which the lens was designed is obtained by adjusting the powers of the negative cylindrical lens and the positive cylindrical lens and the system field curvature is corrected by adjusting the amount of power in the negative cylindrical lens. Each of the elements can be broken up into two or more elements if necessary for the control of optical aberration as is normally the case in any lens design. The lens system as shown, is designed for a laser application and therefore no attempt was made to correct the chromatic aberration. This design employs cylindrical lenses having one plano surface to minimize difficulty of manufacture and, therefore, cost.

Another lens system 50 according to the invention is shown in FIG. 5 in the same conventional cross-section as used in optical work. FIG. 5(a) is the optical cross-section in the plane of beam deflection, while FIG. 5(b) is the optical cross-section in a plane normal to the deflection plane. Again a negative plano-concave cylindrical lens element 72 having the axis thereof perpendicular to the plane of deflection and a spherical lens element 74 are used but an addition spherical lens element 76 is used in place of the positive cylindrical lens element of the design shown in FIG. 4. With the design shown in FIG. 5 the relative amount of power in the two azimuths is adjusted by adjusting the power in the negative cylindrical element and the field curvature must be adjusted by properly choosing the proper axial position of the lens elements. In some designs the order of the lenses may be altered, i.e. the negative cylindrical lens may not be closest to the deflection means, and the "bending" and the spacing of the lenses may be different than that shown here in order to correct aberrations of the system for a particular application.

While the invention has been shown and described with reference to specific embodiments thereof, it should be understood that those skilled in the art will make changes without departing from the spirit and scope of the invention as defined hereinafter in the appended claims concluding the specification.

The invention claimed is:

1. An optical system for line scanning apparatus comprising,
   apparatus for generating a beam of rays of radiant energy,
   apparatus for deflecting said beam of radiant energy,
   an optical element interposed between said generating and said deflecting apparatus for focussing rays of said beam of radiant energy in the azimuth normal to the plane of deflection of said deflecting apparatus to a line substantially on said deflecting apparatus,
   apparatus arranged for intercepting and imaging said beam of radiant energy as deflected from said deflecting apparatus, and
   a nonrecollimating optical system having a negative cylindrical element with the axis thereof situated perpendicular to the plane of deflection of said beam by said deflection apparatus and interposed between said deflecting apparatus and said intercepting apparatus for focussing said deflected beam on said intercepting apparatus.

2. An optical system for line scanning apparatus as defined in claim 1 and wherein
   said nonrecollimating optical lens system also has a spherical lens and another lens.

3. An optical system for line scanning apparatus as defined in claim 2 and wherein
   said other lens is a positive cylindrical lens.

4. An optical system for line scanning apparatus as defined in claim 2 and wherein
   said other lens is another spherical lens.

5. An optical system for line scanning apparatus as defined in claim 1 and wherein
   said nonrecollimating lens system comprises a plano-concave cylindrical lens.

6. An optical system for line scanning apparatus comprising,
   laser apparatus for generating a beam comprising rays of light,
   rotating mirror apparatus for deflecting said beam of light,
   an optical lens element interposed between said laser and said rotating mirror apparatus for converging and focussing rays of said beam of light in the azimuth normal to the plane of deflection of said deflecting apparatus to a line substantially on said deflecting apparatus, photoresponsive rotating drum apparatus arranged for intercepting said beam of light as deflected from rotating mirror apparatus, and a nonrecollimating optical lens system having a negative cylindrical lens element with the axis thereof arranged perpendicular to the plane of deflection of said beam of light by said rotating mirror apparatus and interposed between said rotating mirror apparatus and said rotating drum apparatus for focussing said deflected beam on said rotating drum apparatus.

7. An optical system for line scanning apparatus as defined in claim 6 and wherein said optical lens element is a cylindrical lens.

8. An optical system for line scanning apparatus as defined in claim 6 and wherein said nonrecollimating lens system also comprises a positive cylindrical lens element having an axis rotated 90° from the axis of said negative lens element.

9. An optical system for line scanning apparatus as defined in claim 6 and wherein said rotating drum is coated with a photoconductor.

10. An optical system for line scanning apparatus as defined in claim 9 and incorporating light modulating apparatus interposed between said laser and said optical lens element.

11. An optical system for line scanning apparatus comprising, apparatus for generating a beam of rays of radiant energy, apparatus for deflecting said beam of radiant energy, a cylindrical optical element interposed between said generating and said deflecting apparatus for focussing rays of said beam of radiant energy in the azimuth normal to the plane of deflection of said deflecting apparatus to a line substantially on said deflecting apparatus, apparatus arranged for intercepting said beam of radiant energy as deflected from said deflecting apparatus, and a nonrecollimating optical system having a negative cylindrical element with the axis thereof situated perpendicular to the plane of deflection of said beam by said deflection apparatus and interposed between said deflecting apparatus and said intercepting apparatus for focussing said deflected beam at a spot on said intercepting apparatus lying in a line in said plane of deflection.

12. An optical system for line scanning apparatus comprising, an apparatus for generating a beam of rays of radiant energy, apparatus for deflecting said beam of radiant energy, an optical element interposed between said generating and said deflecting apparatus for focusing rays of said beam of radiant energy in the azimuth normal to the plane of deflection of said deflecting apparatus to a line substantially on said deflecting apparatus, apparatus arranged for intercepting and imaging said beam of radiant energy as deflected from said deflecting apparatus, and a nonrecollimating optical system having a negative cylindrical element with the axis thereof situated perpendicular to the plane of deflection of said beam by said deflection apparatus and interposed between said deflecting apparatus and said intercepting apparatus for focusing said deflected beam in a line in the azimuth normal to said plane of deflection on said intercepting apparatus while permitting rays in said plane to pass substantially without alteration.

* * * * *